United States Patent Office 3,279,597
Patented Oct. 18, 1966

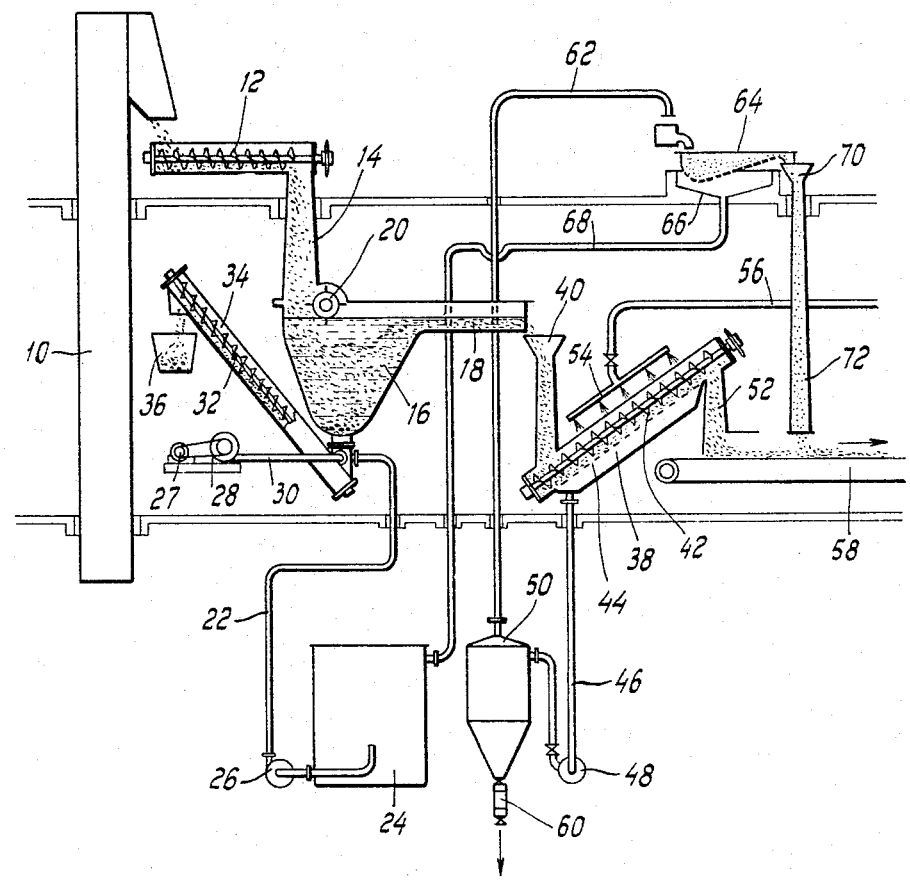

3,279,597
METHOD OF REMOVING FOREIGN PARTICLES FROM CHIPS OF CELLULOSE AND SIMILAR MATERIALS
Rolf Bertil Reinhall, Lidingo, Sweden, assignor to Defibrator Aktiebolag, Stockholm, Sweden, a corporation of Sweden
Filed July 9, 1962, Ser. No. 208,269
Claims priority, application Sweden, July 14, 1961, 7,338/61
2 Claims. (Cl. 209—17)

This invention relates to the production of chips from cellulose and similar materials.

More particularly this invention relates to the production of chips from cellulose and similar materials to be used, for example, in the manufacture of fibre boards.

One difficulty encountered in the production of chips of the type set forth is the removal therefrom of foreign bodies which may be magnetic, for example, particles of iron, and none-magnetic, for example, sand, scrap and stones.

It has been proposed to employ magnetic separators to remove the magnetic impurities but this proposal involves considerable expense and frequently the non-magnetic impurities remain in the chips causing damage to machinery and other tools during subsequent working operations.

It is an object of this invention to provide a method and apparatus for the removal of foreign bodies having a specific weight exceeding that of the chip material.

According to one main feature of the present invention there is provided a method of removing foreign bodies from chips of cellulose and similar materials which comprises subjecting the chips to a number of washing operations in water, removing relatively coarse objects in a first operation in which water in a bath is brought into vorticity and removing relatively fine particles by draining water from the chips in a subsequent operation.

The drainage in the second operation is conveniently effected while the material is agitated in a screw conveyor having a perforated casing.

The invention also includes an apparatus which comprises a trough-like separator in which relatively coarse objects are removed from the chips, the separator having an intake at its base so that water can be introduced into the separator and a feeding device for carrying the chip material below the water level in the separator, and draining element having a conveyor screw surrounded by a perforated casing.

Further objects and advantages of the invention will become apparent from the folowing description considered in connection with the accompanying drawing which forms part of this specification and which is a diagrammatic and partly sectioned view of one form of apparatus adapted to carry out the method in accordance with the invention.

Referring to the drawing, reference numeral 10 denotes a vertical silo having a conveyor (not shown) for delivering wood chips to a horizontal screw conveyor 12. Chips from the screw conveyor 12 are fed in to a hopper 14 and then by gravity into a separator 16 which is substantially filled with water, the seperator being the form of a trough whose horizontal cross-sectional area diminishes downwardly. The upper portion of the separator is enlarged to form a flute 18. The distance the chips fall in the hopper 14 is relatively great so that the chips, due to the drop, are submerged below the level of the water in the separator 16. A feeder device consisting of a wheel 20 with four radial blades serves to force chips floating on the surface down into the water.

Water is supplied to the separator 16 through a conduit 22 from a tank 24 by a pump 26. The conduit 22 opens tangentially into the lower portion of the separator 16 and the circulating water pumped in to the separator brings the contents of the separator into state of vigorous vorticity whereby coarser or heavy objects, such as particles of metal, stone, concrete and the like, are separated from the chips. In order to bring about the desired vorticity and lifting capacity, air from a compressor or a turbo-fan 28 driven by a motor 27, may in addition be supplied through a conduit 30 which connects tangentially into the lower portion of the separator 16. This air is compressed to the pressure of 200–300 mm. water column, for example. Foreign objects separated from the chips collect at the bottom of the separator 16 and are removed by an extraction screw 32, working within a tube 34, to a collecting container 36. The removed objects may, if desired, be collected in a tube, not shown, and fitted with shutoff valves and a device for intermittent emptying.

The chips are then carried by the water through flute 18 and a vertical feeder channel 40 to a draining element 38 having a screw conveyor 42 which is inclined and surrounded by a perforated wall 44. When the chips are fed upwardly within the screw conveyor 42 finer impurities such as sand are separated and, together with water passing through the perforated wall 44, are conveyed through a conduit 46 by means of a pump 48 to a sand separator 50. The perforations of the partition wall 44 are adjusted according to the magnitude of the impurities to be separated whereas the chips proper at least to a substantial degree continue upwards and are delivered to an outlet 52. The screw 38 may be a conventional screw conveyor the trough of which is formed as a perforated plate 44. The chips during their passage through the draining element 38 may be sprayed with fresh water (or water from the production line) through a sprayer 54 connected with a supply conduit 56 for such water. The quantity of water sprayed may be adjusted according to the quantity of water removed from the chips during their passage through the preceding part of the apparatus so that removal of water from the apparatus per se does not become necessary. The sprayed chips are then fed on to a conveyor band 58 for further treatment such as heating, defibration, refining and so on.

The water escaping from the draining element 38 through the conduit 46 is pumped to a centrifugal separator 50, in which sand and other heavier particles with a specific weight surpassing that of the wooden material are separated from the water. The centrifugal separator may have greater dimensions than normally required so that it is operative at relatively low speeds. The separated sand is collected on the bottom of the cleaner and may be discharged continuously or intermittently through an outlet 60.

The water conveyed from the dewaterer 38 to the centrifugal separator 50 may contain minor wood particles such as sawdust, bark and the like. These particles are conveyed through a conduit 62 together with the water escaping from the centrifugal separator to a slotted vibrating screen 64 where the wood particles and the water are separated from one another.

The water passes through the screen, into a hopper 66 from where it is fed through conduit 68 into tank 24. The wood particles remaining on the screen are conveyed by vibrating the latter, to a hopper 70, through a conduit 72 on to the conveyor band 58.

It will be understood from the above that the water used for spraying the wood chips is, to a large extent, recirculated within the apparatus per se and, consequently, discharge of water from the apparatus which may result in the contamination of natural water-courses and the like need not occur. The quantity of water which the chips absorb is replaced through the fresh water spray 54. According to this invention one advantage of an apparatus is that severe damages and even destruction of the grinding members hitherto experienced in defibrating and refining processes due to solid impurities of metal, mineral and similar nature accompanying the chip stock are considerably reduced. The life of the grinding members is therefore increased.

Over extensive trials we have found that the life of the grinding members has been increased threefold. Further, because a manufactured product, such as the fibre board, contains less sand and other impurities the wear on tools in subsequent working of the products is also reduced.

While one more or less specific embodiment of the invention has been shown and described, it is to be understood that this is for purpose of illustration only, and that the invention is not to be limited thereby, but its scope is to be determined by the appended claims.

Furthermore, while the drawing specifically shows a screw conveyor for moving the chips, it should be understood that equivalent conveyor means may be used.

What I claim is:

1. A method of removing foreign bodies from chips of cellulose and similar materials comprising delivering the mixture into a water-filled separator having an upper outlet, feeding the mixture at the upper level of the water in the separator and forcing the mixture from the surface of the water down into the water to thereby submerge the mixture, tangentially introducing the water into the bottom of the separator thereby bringing the water in the separator into vorticity by which objects contained in the mixture and heavier than the chips therein are separated from the chips, overflowing the chips and relatively finer impurities out of the outlet to draining means having a perforated wall around conveyor means, feeding the chips and said finer impurities upwardly by said conveyor means to cause said finer impurities to be separated from the chips and passed with the water through the perforated wall, spraying the chips and the relatively finer impurities with water while they are in movement by the conveyor means, and delivering the separated chips from the conveyor means.

2. The method according to claim 1, further comprising the step of passing the relatively finer impurities and water into a vessel, the water passed through the perforated wall of the conveyor means being initially made free from the small foreign impurities and thereafter from the entrained smaller particles of the material, the water being then returned to its initial washing operation.

References Cited by the Examiner

UNITED STATES PATENTS

| | | | |
|---|---|---|---|
| 2,105,101 | 1/1938 | Stelley | 209—158 |
| 2,491,912 | 12/1949 | Walker | 209—172.5 |
| 2,701,641 | 2/1955 | Krijgsman | 209—172.5 |
| 2,823,801 | 2/1958 | Strohl | 209—211 |
| 3,035,697 | 5/1962 | Koch | 209—161 |

FRANK W. LUTTER, *Primary Examiner.*

HARRY B. THORNTON, *Examiner.*